(No Model.) 2 Sheets—Sheet 1.

J. PEDDER.
FURNACE FOR MELTING GLASS, &c.

No. 323,728. Patented Aug. 4, 1885.

Witnesses.
F. G. Skay
J. M. Cooke

Inventor.
John Pedder
by James I. Kay
Attorney

N. PETERS, Photo-Lithographer, Washington, D. C.

(No Model.) 2 Sheets—Sheet 2.

J. PEDDER.
FURNACE FOR MELTING GLASS, &c.

No. 323,728. Patented Aug. 4, 1885.

Witnesses.

Inventor.
John Pedder
by James T. Ray
Attorney

UNITED STATES PATENT OFFICE.

JOHN PEDDER, OF PITTSBURG, PENNSYLVANIA.

FURNACE FOR MELTING GLASS, &c.

SPECIFICATION forming part of Letters Patent No. 323,728, dated August 4, 1885.

Application filed September 22, 1883. (No model.)

*To all whom it may concern:*

Be it known that I, JOHN PEDDER, of Pittsburg, in the county of Allegheny and State of Pennsylvania, have invented a new and useful Improvement in Furnaces for Melting Glass, &c.; and I do hereby declare the following to be a full, clear, and exact description thereof.

My invention relates to certain improvements in glass-melting furnaces or furnaces for melting or heating other substances, its object being to improve and cheapen the construction and operation of that class of furnaces in which the draft is reversed across the melting or heating bed, and the waste heat is collected from the waste products in regenerators or suitable heat-absorbing devices, and carried back into the melting or heating chamber.

It consists, essentially, in a reversible regenerative furnace for melting and heating glass and other substances, having a regenerator at each end of and adjoining the furnace-bed and inclosed under the same roof.

It also consists in certain improvements in the construction of the furnace, and the arrangement of the flues leading therefrom.

To enable others skilled in the art to make and use my invention, I will describe the same more fully, referring to the accompanying drawings, in which—

Figure 1:
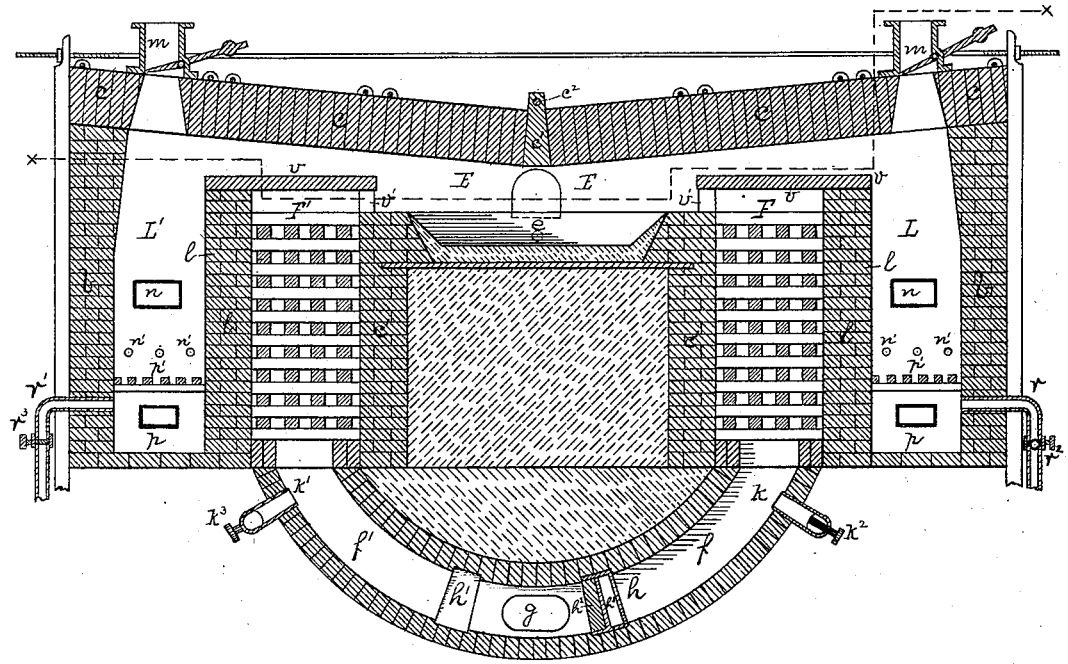
Figure 2:
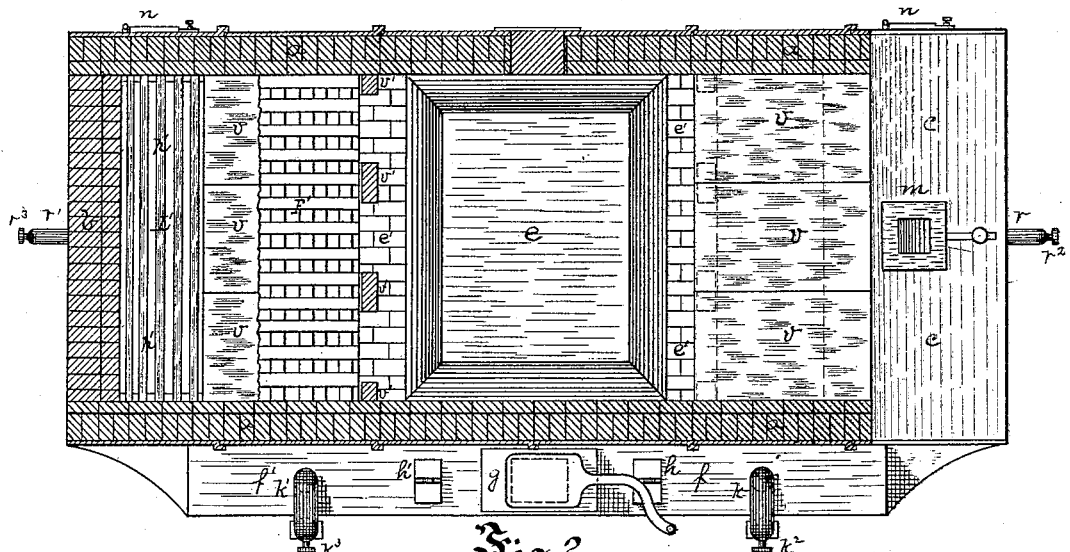
Figure 3:
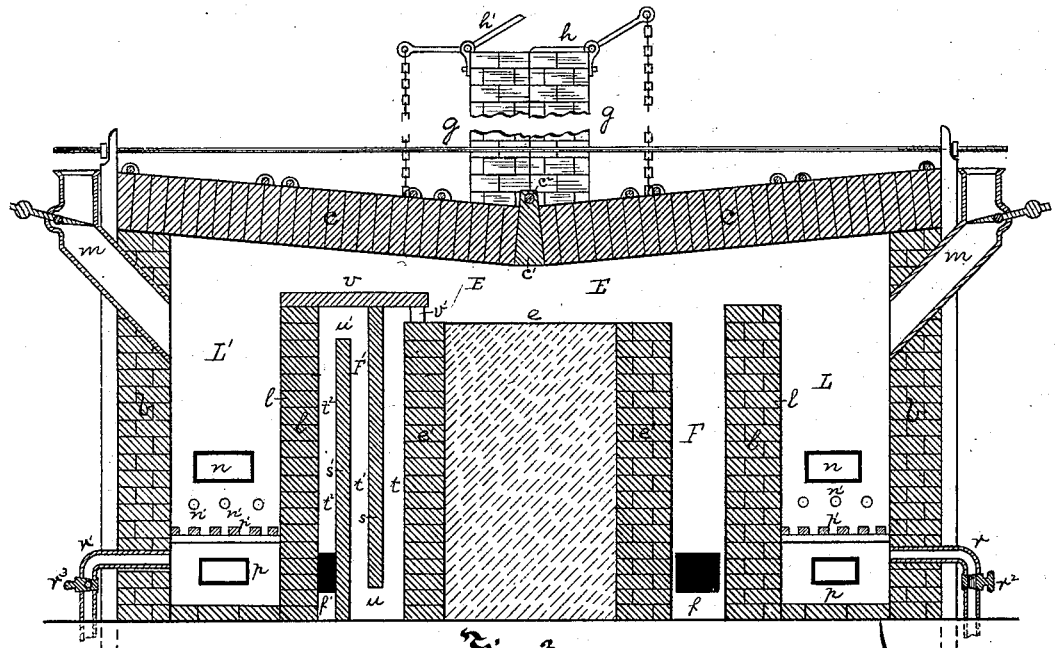
Figure 4:
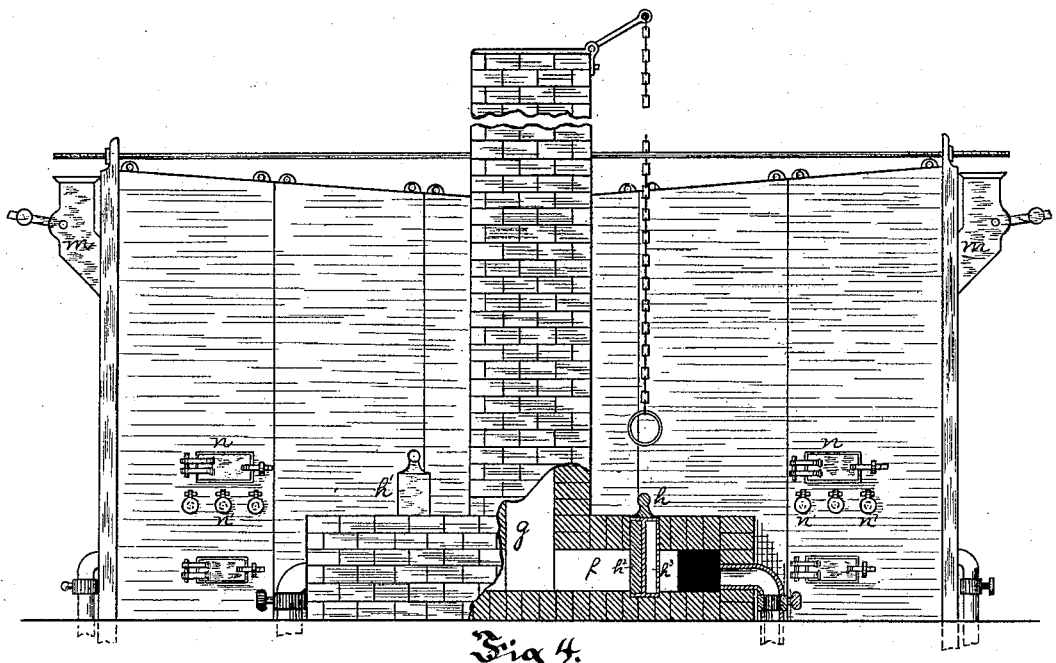

Figure 1 is a longitudinal central section thereof. Fig. 2 is a horizontal section on the line $x$ $x$, Fig. 1. Fig. 3 is a longitudinal section, and Fig. 4 is a side view partly broken away.

Like letters of reference indicate like parts in each.

The furnace shown is inclosed in the side walls, $a$, end walls, $b$, and roof $c$, the whole being braced together by suitable plates and braces. It is provided with the melting or heating bed $e$ in the furnace-chamber E, the bed being supported on the walls $e'$, and, when employed for melting glass or other substances, being formed substantially as shown in Figs. 1 and 2; but when employed for melting steel, reheating, tempering, or like purposes, being formed as shown in Fig. 3, the space under the furnace-bed being either filled with earth or left open to permit the free circu'ation of air.

At each end of the bed $e$, on or above the floor-level, is a regenerator, the walls $e'$ forming the inner walls of these regenerators F F', and the regenerators being thus in close proximity to the melting-bed, so that the waste products of combustion enter directly into them without passing through long flues and losing part of their heat, as is the case where the regenerators are located under the furnace. The flues $f f'$ at the base of the regenerators may lead down under the ground below the furnace, as shown in Fig. 1, and thence to the stack-flue $g$, this arrangement being employed where several furnaces communicate with one stack; or the flues $f f'$ may be formed at or above the ground-level, as shown in Figs. 2, 3, and 4, and lead to the stack $g$ at the side of the furnace, a separate stack being employed for each regenerator, if desired. Where the regenerators communicate with a single stack or stack-flue, suitable dampers or valves, $h h'$, are located in the flues $f f'$, so as to open or close communication with the stack, according to the direction of the draft through the furnace-chamber, and as the heated products strike against these valves when closed, they are provided with tile $h^2$ on one side, and an air-box, $h^3$, behind said tile, to prevent their rapid burning out. Where a separate stack is employed for each regenerator, as shown in Fig. 3, the valves $h h'$ are simply the ordinary dampers on the top of the stacks, operated by a chain, and where each furnace has a separate stack, as shown in Fig. 4, I also employ one of these top dampers to regulate the draft. Suitable air-pipes, $k k'$, communicate with the flues $f f'$, respectively, to supply air to the furnace, the pipes having suitable valves, $k^2 k^3$. At the ends of the furnace, beyond the regenerators F F', are the gas-producers L L', in which the gas employed in the furnace is generated, the producers being separated from the regenerators by the walls $l$, and having suitable feeding-hoppers, $m$, at the top or side thereof. In the side of each producer is the door $n$, as well as poke-holes $n'$, for stirring and regulating the fire therein, and at the base is the ash-pit $p$ and grate $p'$, a shaking-grate being preferably employed. Leading into the producers, under the grates, are the pipes $r$ $r'$, by means of which steam or air is supplied to the producers, the supply being regulated by the valves $r^3$ $r^4$ in said pipes. The melting-bed, regenerators, and gas-producers are all placed in juxtaposition with each other and under the common roof $c$, thus greatly cheapening the construction of the furnace, doing away with the necessity of the deep pits and separate arches and side walls for the regenerators and producers, by making the furnace compact, preventing the loss or radiation of heat through the walls of the furnace, storing the heat in the regenerators as soon as it passes from the melting-chamber and carrying it back thereto without requiring it to pass through long flues, and preventing the heating of the working-floor around the furnace by radiation from the regenerators, as is the case where they are located under the furnace.

The furnace-roof is constructed in such a way that few special shapes of brick are required, and all liability of injury to it on account of the shrinking or warping of the brick-work under the intense heat is overcome, while at the same time the gas and air are directed down into the melting-chamber. This I accomplish by means of the central course of long key-bricks, $c'$, which are of the proper key to impart the necessary slope to the roof, so that it may be built of the common brick, this course of bricks being hung or supported from above the roof by the central brace-rod, $c^2$, of the furnace, which passes through holes in the bricks where they extend above the roof, and so holds up this course, while the courses of common brick on each side thereof are supported by this key-brick, and in case of shrinkage the roof has thus a firm support not exposed to the heat.

The construction of the regenerators of heat-retaining chambers or devices may vary at the will of the builder, the regenerators having checker-work built up therein to retain the heat, as shown in Figs. 1 and 2, or being of other form, such as either of the forms shown in Fig. 3. The regenerator shown to the left in Fig. 3 is formed of a series of vertical partition-walls, $s$ $s'$, thus dividing the regenerator into a series of vertical chambers, $t$ $t'$ $t^2$, and the chambers $t$ $t'$ communicate through a port, $u$, at the base of the wall $s$, while the chambers $t'$ $t^2$ communicate through a port, $u'$, at the top of the wall $s'$, and the flue $f'$ opens out of the chamber $t^2$. The walls $s$ $s'$ may be built out of thin brick-work or large tile connected by tongue-and-groove joints. In regenerators of this construction the waste products pass from the melting-chamber in a circuitous course through the chambers $t$, $t'$, and $t^2$, and thence to the stack, and the heat thereof is absorbed and stored by the walls of the regenerator and the partition-walls $s$ $s'$, and afterward imparted to the cold air fed through the regenerator to the furnace-chamber. In the regenerator shown to the right of Fig. 3 the chamber is made narrow, and the heat is absorbed and stored by the side and end walls of the chamber, this form being only employed in the heating and tempering furnaces where an exceedingly high heat is not required. Where the checker-work or partition-walls are employed, in order to cover the regenerator-chambers I employ the tile $v$, which are supported on the walls $l$, and the piers $v'$ on the walls $e'$, the tile thus forming covers for the chambers and directing the heated air horizontally into the furnace-chamber. When the tile-covers burn out, they can be replaced with but little trouble and expense, and when so replaced there is no liability of any brick or mortar falling into the checker-work and clogging it, as would be the case if an arched brick roof were employed.

The operation of my improved furnace is as follows: Fuel is fed into the producers L L', and when sufficient gas is generated the supply of steam or air to one producer—as, for example, the left producer, L'—is closed by its valve $r^3$, and the left regenerator-flue, $f'$, and right air-pipe, $k$, are opened. The gas then passes from the right producer, L, over the right regenerator, F, into the melting or furnace chamber E, and the air passes up through this regenerator to the melting-chamber, mixing with the gas and forming combustion. The heated products pass from the melting-chamber down through the left regenerator, F', through the left flue, $f'$, to the stack, the heat therefrom being absorbed and stored in this regenerator. While the furnace is operating, as above described, as there is no draft through the left producer, L', and but little air enters it, the fuel therein is gradually coked and raised to a high heat, sufficient to generate gas, but on account of the absence of oxygen generating but little gas. As soon as the furnace is reversed and air or steam is fed thereto, the gas is quickly freed from the fuel, and the gas and heat so generated pass over into the melting-chamber. When it is desired to reverse the furnace, the left regenerator-flue, $f'$, is closed by its valve $h'$, and the right pipes, $k$ and $r$, are closed by the valves $k^2$ and $r^2$, while the valves $h$, $k^3$, and $r^3$ in the right regenerator-flue, $f$, and left pipes, $k'$ and $r'$, respectively, are opened, the generation of gas in the right producer, L, being suspended, and the gas in the left producer, L', passing into the melting-chamber and meeting the heated air rising through the left regenerator, F', while the heated products pass through the right regenerator, F, to the stack. By reversing the furnace it is thus rapidly raised to a high heat, sufficient for melting glass or other highly-refractory materials, or as for general heating purposes. The heat is absorbed and stored for regenerative purposes as soon as it leaves the melting-chamber, and the regenerators are further heated by the producers, the heat passing through the division-walls, and much heat being saved thereby. The gas is employed as soon as generated while at a high heat, so that no separate means of heating it are necessary, and the amount needed can be accurately regulated by the amount of steam or air fed to the producers, the necessity of conducting the gas for long distances from the producers being obviated. As all the heated products of combustion pass through one regenerator, it can be heated more rapidly and raised to a higher heat than where two regenerators are necessarily heated by these products, so that so large a regenerator is not required, and a large saving of fuel is obtained, the reheating of the gas being unnecessary, as it passes directly from the producer into the furnace-chamber at a high heat.

The construction of the furnace is simple and compact, and loss of heat from radiation is reduced to a minimum. All complicated valve apparatus is done away with, the furnace being controlled, if desired, by the common dampers at the top of the stacks and by a few valves in pipes.

I have particularly described my invention where the producers are located near the furnace-chamber and the gas passes without further heating into the furnace-chamber. It is evident, however, that parts of my invention—for example, the construction and location of the regenerators—are applicable to furnaces of other constructions—as, for example, where both the air and gas are heated in regenerators—and when so used I also include them within my invention.

What I claim as my invention, and desire to secure by Letters Patent, is—

1. A reversible regenerative furnace for melting or heating glass or other substances, having a regenerator at each end of and adjoining the furnace-bed and inclosed under the same roof or arch therewith, substantially as and for the purposes set forth.

2. A reversible regenerative furnace for melting or heating glass or other substances, having a regenerator at each end of and adjoining the furnace-bed, and on or above the floor-level of the furnace, substantially as and for the purposes set forth.

3. A reversible regenerative furnace for melting or heating glass or other substances, having a regenerator at each end of and adjoining the furnace-bed, and on or above the floor-level of the furnace, and flues on or above the floor-level leading from the regenerators to the stack, substantially as and for the purposes set forth.

4. A reversible regenerative furnace for melting or heating glass or other substances, having a furnace-bed, an air-regenerator at each end of and adjoining said bed, and gas-producers beyond said air-regenerators, and extending above the floor-level of the furnace, substantially as and for the purposes set forth.

5. A reversible regenerative furnace for melting and heating glass and other substances, having a furnace-bed, an air-regenerator at each end and adjoining said bed, and gas-producers beyond said air-regenerators, all being inclosed under the same roof, substantially as and for the purposes set forth.

6. A regenerative-furnace roof formed of one or more cases of key brick or tile hung or supported from above the roof over the furnace-bed, and courses of brick-work supported by said key-course and the furnace-walls, substantially as and for the purposes set forth.

7. In a regenerative furnace, the roof $c$, formed of the course of long key-bricks $c'$, having holes in their upper ends, and supported by a brace-rod passing through said holes, and the courses of bricks built on either side thereof, substantially as and for the purposes set forth.

In testimony whereof I, the said JOHN PEDDER, have hereunto set my hand.

JOHN PEDDER.

Witnesses:
   JAMES I. KAY,
   F. G. KAY.